United States Patent [19]

McKay et al.

[11] 4,283,274

[45] Aug. 11, 1981

[54] PROCESS FOR CRACKING HYDROCARBONS WITH A CRACKING CATALYST PASSIVATED WITH THALLIUM

[75] Inventors: Brent J. Bertus, Dwight L. McKay, both of Bartlesville, Okla.

[73] Assignee: Phillips Petroleum Company, Bartlesville, Okla.

[21] Appl. No.: 145,092

[22] Filed: Apr. 30, 1980

Related U.S. Application Data

[62] Division of Ser. No. 949,299, Oct. 6, 1978, Pat. No. 4,238,367.

[51] Int. Cl.³ ................... C10G 9/16; C10G 11/05
[52] U.S. Cl. ..................... 208/120; 208/52 CT; 252/466 J
[58] Field of Search ............... 208/120, 113, 52 CT; 252/411 R, 440, 463

[56] References Cited

U.S. PATENT DOCUMENTS

| | | | |
|---|---|---|---|
| 2,172,542 | 9/1939 | Morrell | 252/440 X |
| 2,901,419 | 8/1959 | Brill | 208/119 |
| 3,157,688 | 11/1964 | Arnold et al. | 252/440 X |
| 3,647,682 | 3/1972 | Rabo et al. | 208/120 |
| 4,025,458 | 5/1977 | McKay | 208/120 X |
| 4,031,002 | 6/1977 | McKay | 208/113 |
| 4,067,823 | 1/1978 | White et al. | 252/440 X |
| 4,217,205 | 8/1980 | Marcilly et al. | 208/139 |

Primary Examiner—Delbert E. Gantz
Assistant Examiner—G. E. Schmitkons

[57] ABSTRACT

A hydrocarbon cracking catalyst treated with thallium to passivate thereon contaminating metals, e.g., vanadium, iron and/or nickel is used in a process for cracking a hydrocarbon.

4 Claims, No Drawings

PROCESS FOR CRACKING HYDROCARBONS WITH A CRACKING CATALYST PASSIVATED WITH THALLIUM

This is a divisional of application Ser. No. 949,299, filed Oct. 6, 1978, now U.S. Pat. No. 4,238,367.

This invention relates to cracking of a hydrocarbon. In one of its aspects the invention relates to a process of cracking hydrocarbon, e.g., a hydrocarbon oil with a catalyst which has been treated to passivate a contaminating metal whenever it appears thereon.

In one of its concepts the invention provides a catalytic cracking operation suited for the beneficiation of a hydrocarbon, e.g., a hydrocarbon oil, which comprises contacting catalyst, used or unused, with thallium or a thallium-containing compound.

Cracking catalysts, when used to crack oil that contains metals, e.g., vanadium, iron and nickel, accumulate a deposit of these metals. This decreases the yield of gasoline and increases the yield of hydrogen and coke. As known, hydrocarbon feedstock containing higher molecular weight hydrocarbons is cracked by contacting it at an elevated temperature with a cracking catalyst to produce light distillates such as gasoline. The cracking catalyst gradually deteriorates during the cracking operation. A reason for this deterioration is the deposition of contaminating metals such as vanadium, iron and/or nickel on the catalyst. This results in the earlier mentioned disadvantages and also, usually, in a decreased conversion of the hydrocarbon into gasoline.

When the very large amounts of hydrocarbon processed, the high percentage of oil needs of our Country which are now imported and the potential shortage of oil in the world are considered, it is seen that any improvement in the affected results of catalytic cracking of hydrocarbon can be significant. Therefore, there is a need for a cracking process which will prevent or at least reduce significantly at least some of the deleterious effects of the above-mentioned metal contaminants.

U.S. Pat. No. 3,647,682, Mar. 7, 1972, discloses a process of obtaining olefin by catalytic cracking of petroleum feedstocks, particularly those rich in saturated hydrocarbons, using novel zeolitic molecular sieve catalysts which are fully cationized with monovalent and/or bivalent metal cation. Included among metal cations which can be present in the zeolite catalyst is thallium ($Tl^+$).

The feedstocks to which the invention of the patent is stated therein to be applicable are found listed in column 4. It appears that pure or, in effect, purified feedstocks are there suggested.

It is an object of this invention to provide a hydrocarbon cracking operation in which metals tending to contaminate catalyst, thereby reducing its effectiveness or efficiency, are passivated.

Other aspects, concepts, objects and the several advantages of the invention are apparent from a study of the disclosure and the appended claims.

According to the present invention, contaminating metals, e.g., vanadium, iron and/or nickel, deposited on a catalyst, e.g., a cracking catalyst, suitable for cracking hydrocarbons, e.g., hydrocarbon oil, are passivated thereon whenever they appear by treating the catalyst, before and/or after using the same for converting a hydrocarbon, e.g., a hydrocarbon oil, to add thereto thallium.

The catalyst initially treated can be used or unused.

Thus, according to the invention, there is provided a catalytic cracking operation suitable for cracking hydrocarbon oil which comprises applying to the catalyst, used or unused, thallium.

When the catalyst is an unused cracking catalyst it is treated with thallium to reduce its susceptability to the deleterious effects of later-deposited contaminating metal, e.g., vanadium, iron and/or nickel.

It has been demonstrated that in a process for cracking gas oil which contains metal contaminants that is nickel, vanadium and/or iron, that a metals-contaminated cracking catalyst to which thallium has been added in the form of one of its compounds, thallous sulfate, not only reduced yield of coke significantly, but reduced the yield of hydrogen significantly but importantly also, increased the yield of gasoline substantially as compared with a catalyst to which no thallium had been added.

Metals-contaminated cracking catalysts that are passivated are any that are active to crack hydrocarbons in the absence of added hydrogen. This includes amorphous silica-alumina and compositions that contain zeolites-synthetic or natural.

The term "cracking catalyst" as used herein refers to either new or used cracking catalyst materials that are useful for cracking hydrocarbons in the absence of added hydrogen. The cracking catalyst referred to can be any conventional cracking catalyst.

Such cracking catalyst materials can be any of those cracking catalysts conventionally employed in the catalytic cracking of hydrocarbons boiling above 400° F. (204° C.) for the production of gasoline, motor fuel, blending components and light distillates. These conventional cracking catalysts generally contain silica or silica-alumina. Such materials are frequently associated with zeolitic materials. These zeolitic materials can be naturally occurring, or they can be produced by conventional ion exchange methods such as to provide metallic ions which improve the activity of the catalyst. Zeolite-modified silica-alumina catalysts are particularly applicable in this invention. Examples of cracking catalysts into or onto which thallium can be incorporated include hydrocarbon cracking catalysts obtained by admixing an inorganic oxide gel with an aluminosilicate and aluminosilicate compositions which are strongly acidic as a result of treatment with a fluid medium containing at least one rare earth metal cation and a hydrogen ion, or ion capable of conversion to a hydrogen ion. The unused catalytic cracking material employed will generally be in the particulate form having a particle size principally within the range of about 10 to about 200 microns.

If desired, the cracking catalyst can contain a combustion promoter such as platinum or chromium.

The unused catalytic cracking material as employed in the present invention contains essentially no nickel, vanadium or iron.

The cracking process in which the thallium-containing catalyst is employed is an improvement over a process employing a conventional, untreated catalyst.

A preferred embodiment of the cracking process of this invention utilizes a cyclic flow of catalyst from a cracking zone to a regeneration zone. In this process, a hydrocarbon feedstock containing contaminating metals, such as vanadium, iron and/or nickel, is contacted in a cracking zone under cracking conditions and in the absence of added hydrogen with thallium-containing cracking catalyst produced by use of a thallium compound as described above; a cracked product is obtained and recovered; the cracking catalyst is passed from the cracking zone into a regeneration zone; and in the regeneration zone the cracking catalyst is regenerated by contacting the cracking catalyst with a free-oxygen-containing gas, preferably air. The coke that has been built up during the cracking process is thereby at least partially burned off the catalyst. The regenerated cracking catalyst is reintroduced into the cracking zone.

Furthermore, it is preferred in carrying out the cracking process of this invention to replace a fraction of the total cracking catalyst by unused cracking catalyst continuously or intermittently. Generally, about 0.5 to about 6 weight percent of the total cracking catalyst is replaced daily by a fresh cracking catalyst. The actual quantity of the catalyst replaced depends in part upon the nature of the feedstock used. The makeup quantity of cracking catalyst can be added at any location in the process. Preferably, however, the cracking catalyst that is makeup catalyst is introduced into the regenerator in a cyclic cracking process.

Also, it is to be understood that the used cracking catalyst coming from the cracking zone, before introduction into the regenerator, is stripped of essentially all entrained liquid or gaseous hydrocarbons. Similarly, the regenerated catalyst can be stripped of any entrained oxygen before it reenters the cracking zone. The stripping is generally done with steam.

The compositions of this invention include cracking catalysts that, during use, have become contaminated with enough vanadium, iron, and/or nickel to impair their cracking selectivity to make gasoline, and have then been at least partially passivated by addition of a compound containing thallium. Also included are unused cracking catalysts that have been treated with a thallium compound to reduce their susceptibility to the deleterious effects of deposited vanadium, iron, and/or nickel.

Tha quantity of thallium or compound thereof to use should add about 0.01 to 8 weight percent, preferably about 0.02 to 2 weight percent, of thallium to the catalyst. These concentrations are expressed as the element, and are based on the weight of the catalyst prior to addition of the thallium.

A variety of methods may be used to apply the thallium-containing material to the catalyst. The manner in which the thallium or thallium-containing material or compound is applied to the catalyst does not appear to be critical. It may be added as a finely divided solid and dispersed by rolling, shaking, stirring, etc. Or it may be dissolved in a suitable solvent, aqueous or organic, and the resulting solution used to impregnate the cracking catalyst-followed by drying to remove the solvent. Or it may be dissolved or suspended in the oil that is the feedstock to the cracking process where, by virtue of its negligible vapor pressure at reaction conditions, it is retained on the catalyst.

In general, any compound furnishing thallium to the catalyst or thallium as the element suitably applied, e.g., inorganic compounds containing thallium, for example, thallous and thallic compounds can be used. However, since the latter are strong oxidizing agents they will tend to become reduced at the conditions that obtain in a FCC unit and are not listed here. It should be understood that the following thallous compounds may have been derived from thallic analogues. Suitable inorganic compounds include thallous oxide, thallous sulfide, thallous selenide, thallous telluride, thallous carbonate, thallous nitrate, thallous sulfate, thallous orthophosphate, thallous cyanide, and the like; organic compounds which are suitable include salts of carboxylic acids such as thallous acetate, thallous oxalate, thallous laurate, thallous myristate, thallous palmitate, thallous oleate, thallous stearate, and the like. Also, suitable, but less preferable because of corrosion problems they can cause, are halogen-containing compounds such as thallous chloride, thallous bromide, thallous iodide, and their oxy derivatives such as thallous chlorate and thallous bromate. Thallium and its compounds are known to be toxic. Care should be exercised in handling them.

Feedstocks amenable to treatment by the thallium-conditioned, cracking catalyst of this invention are, generally, oils having an initial boiling point above 204° C. which contain contaminating metals, e.g., iron, nickel and/or vanadium. This includes gas oils, fuel oils, topped crude, shale oil, and oils from coal and/or tar sands. The cracking process may utilize a fixed catalyst bed or a fluidized catalyst. The latter is preferred.

Specific conditions in the cracking zone and the regeneration zone of a fluid catalytic cracker depend on the feedstock used, the condition of the catalyst, and the products sought. In general, conditions in the cracking zone include Temperature: 427°–649° C. (800°–1200° F.)
Contact time: 1–40 seconds
Pressure: 10 kiloPascals to 21 megaPascals (0.1 to 205 atm.)
Catalyst:oil ratio: 3/1 to 30/1, by weight and conditions in the regenerator include
Temperature: 538°–816° C. (1000°–1500° F.)
Contact time: 2–40 minutes
Pressure: 10 kiloPascals to 21 megaPascals (0.1 to 205 atm.)
Air rate (at 16° C., 1 atm.): 100–250 ft$^3$/lb coke, or 6.2–15.6 m$^3$/kg coke The feedstock to the catalytic cracker, described above, will contain a significant concentration of vanadium, iron, and/or nickel whose presence will affect adversely the catalyst's selectivity. Since these metals become concentrated in the least volatile fractions, cracking the heavy oils is probably the most important application for the passivated catalyst of this invention. The quantity of added thallium required to passivate vanadium, iron and nickel is related directly to their concentration in the feedstock. The following table relates to the total concentration in the feedstock of these metals to the concentration of added thallium on the cracking catalyst to passivate effectively these adventitious metals.

| Total V, Fe, Ni in Feedstock, ppm | Thallium Added to Catalyst, Wt. %* |
|---|---|
| 40–100 | 0.05–0.8 |
| 100–200 | 0.1–1 |
| 200–300 | 0.15–1.5 |
| 300–800 | 0.2–2 |

*Based on weight of catalyst prior to addition of thallium passivating agent. Quantities are expressed as the element.

This invention is illustrated by the following example.
commercial cracking catalyst that had been used in a commercial fluid catalytic cracker until it had attained equilibrium composition with respect to metals accumulation (catalyst was being removed from the process system at a constant rate) was used to demonstrate passivation with thallium. The catalyst, being a synthetic zeolite combined with amorphous silica/alumina (clay), was predominantly silica and alumina. Concentrations of other elements together with pertinent physical properties are shown in Table I.

TABLE I

| Surface area, $m^2\ gm^{-1}$ | 74.3 |
|---|---|
| Pore volume, $ml\ gm^{-1}$ | 0.29 |
| Composition, wt. % | |
| Nickel | 0.38 |
| Vanadium | 0.60 |
| Iron | 0.90 |
| Cerium | 0.40 |
| Sodium | 0.39 |
| Carbon | 0.06 |

A portion of this used, metals-contaminated catalyst was treated with thallium as follows. To 20 gm of catalyst, 0.1235 gm of finely divided thallous sulfate was added, and the solids were mixed thoroughly by shaking. The catalyst now contained 0.5 weight percent thallium. It was prepared for testing by aging it. The catalyst, in a quartz reactor, was fluidized with nitrogen while being heated to 482° C., then it was fluidized with hydrogen while the temperature was raised from 482° C. to 649° C. Maintaining that temperature, fluidization continued for 5 minutes with nitrogen, then for 15 minutes with air. The catalyst was then cooled to about 482° C., still being fluidized with air. The catalyst was then aged through 10 cycles, each cycle being conducted in the following manner. The catalyst at about 482° C. was fluidized with nitrogen for one minute, then heated to 510° C. during two minutes while fluidized with hydrogen, then maintained at 510° C. for one minute while fluidized with nitrogen, then heated to about 649° C. for 10 minutes while fluidized with air, and then cooled to about 482° C. during 0.5 minutes while fluidized with air. After 10 cycles it was cooled to room temperature while being fluidized with nitrogen, and was ready for testing.

The used and the thallium-treated catalysts was tested in a fixed bed reactor using a gas oil as feedstock to the cracking step. The cracking reaction was carried out at about 482° C. and atmospheric pressure for 0.5 minutes; regeneration was at about 593° C. and atmospheric pressure; the reactor was purged with nitrogen before and after each cracking step.

Properties of the gas oil used in the cracking steps are summarized in Table II.

TABLE II

| API gravity at 15.6° C. | 30.2 |
|---|---|
| BMCI | 30.1 |
| Carbon residue, Ramsbottom | 0.23 wt % |
| Analysis for some elements | |
| Carbon | 88.3 wt % |
| Hydrogen | 11.8 wt % |
| Sulfur | 0.20 wt % |
| Oxygen | 0.075 wt % |
| Nitrogen | 0.08 wt % |
| Nickel | 0.25 ppm |
| Vanadium | 9 ppm |
| Molecular wt. number average | 328 |
| Distillation (by ASTM D 1160-61) | |
| 2% | 288° C. |
| 10 | 320 |
| 20 | 340 |
| 30 | 357 |
| 50 | 399 |
| 70 | 458 |
| 90 | 542 |
| Kinematic viscosity (by ASTM D 445-65) | |
| at 54.4° C. | 62.5 centistokes |
| at 98.9° C. | 39.3 centistokes |

TABLE III

| Catalyst | Catalyst: oil Weight Ratio | Conversion, Vol. % of Feed | YIELD Coke, wt. % of Feed | SCF $H_2$/bbl. Feed Converted | Gasoline Vol. % of Feed |
|---|---|---|---|---|---|
| Used | 7.13 | 72.4 | 9.4 | 707 | 44.3 |
| Used + 0.5% Tl | 6.1 | 66.4 | 7.9 | 430 | 58.2 |

Conversion with the thallium-containing catalyst was lower than with the untreated catalyst, but this was at least partially due to use of a lower catalyst/oil ratio. The addition of 0.5 weight percent thallium reduced the yield of coke by 16%, reduced the yield of hydrogen by 39%, and increased the yield of gasoline by 31%.

Reasonable variation and modification are possible within the scope of the foregoing disclosure and the appended claims to the invention the essence of which is that there is set forth a process for cracking a hydrocarbon, e.g., a hydrocarbon oil, with a cracking catalyst whenever it may be contaminated with a contaminating metal, e.g., vanadium, iron, and/or nickel, the contaminating metal being passivated with thallium, as described.

We claim:

1. A process for cracking a hydrocarbon oil employing an oil cracking catalyst containing zeolite, the effectiveness of which can be reduced by contaminating metal deposits thereon resulting from said hydrocarbon oil which comprises passivating such metal on such catalyst whenever it appears by adding to said catalyst a thallium supplying material.

2. A process according to claim 1 wherein the thallium supplying material is thallous sulfate.

3. A process according to claim 1 wherein the contaminating metal is at least one of iron, nickel and/or vanadium and the thallium is supplied by thallous sulfate.

4. A process according to claim 1 wherein the contaminating metal in said hydrocarbon oil is at least one of iron, nickel and/or vanadium and the effectiveness of said catalyst, with respect to at least one of gasoline yield, coke yield or hydrogen yield, is impaired by said metal and wherein upon addition of the thallium to said catalyst the effectiveness of the catalyst is materially improved.

* * * * *